United States Patent
Römer (10) Patent No.: US 11,378,174 B2
(45) Date of Patent: Jul. 5, 2022

(54) METHOD FOR ASSEMBLING A TRANSMISSION COMPONENT FOR A SEAT HEIGHT ADJUSTMENT

(71) Applicant: FAURECIA AUTOSITZE GMBH, Stadthagen (DE)

(72) Inventor: Bernd Römer, Stadthagen (DE)

(73) Assignee: Faurecia Autositze GmbH, Stadthagen (DE)

(*) Notice: Subject to any disclaimer, the term of this patent is extended or adjusted under 35 U.S.C. 154(b) by 129 days.

(21) Appl. No.: 16/400,712

(22) Filed: May 1, 2019

(65) Prior Publication Data
US 2019/0338843 A1 Nov. 7, 2019

(30) Foreign Application Priority Data
May 2, 2018 (DE) .................... 10 2018 110 525.8

(51) Int. Cl.
| | |
|---|---|
| *F16H 57/023* | (2012.01) |
| *B60N 2/16* | (2006.01) |
| *F16H 57/025* | (2012.01) |
| *F16H 57/02* | (2012.01) |
| *B60N 2/02* | (2006.01) |

(52) U.S. Cl.
CPC .......... *F16H 57/023* (2013.01); *B60N 2/165* (2013.01); *F16H 57/025* (2013.01); *B60N 2/0232* (2013.01); *B60N 2002/0236* (2013.01); *F16H 2057/02082* (2013.01)

(58) Field of Classification Search
CPC ..... B60N 2/165; F16H 57/023; F16H 57/025; F16H 2057/0282
See application file for complete search history.

(56) References Cited

U.S. PATENT DOCUMENTS

2014/0117734 A1* 5/2014 Ruess ................. B60N 2/08
297/344.1

FOREIGN PATENT DOCUMENTS

| DE | 69700026 T2 | 4/1999 |
|---|---|---|
| DE | 202013102551 U1 | 4/1999 |
| DE | 10011147 A1 | 10/2001 |
| DE | 102006026194 B3 | 6/2007 |
| DE | 102008026194 B3 | 6/2007 |
| DE | 102011109640 A1 | 2/2013 |
| DE | 102014207529 A1 | 7/2015 |
| JP | 2013193496 A * | 9/2013 |

OTHER PUBLICATIONS

German Search Report dated Jan. 9, 2019 with respect to counterpart German patent application 10 2018 110 525.8.
Translation of German Search Report dated Jan. 9, 2019 with respect to counterpart German patent application 10 2018 110 525.8.

* cited by examiner

*Primary Examiner* — Anthony D Barfield
(74) *Attorney, Agent, or Firm* — Henry M. Feiereisen LLC (57) ABSTRACT

The invention relates to a method for assembling a transmission component of a seat height adjustment on a seat frame of a motor vehicle seat, which comprises the method steps of positioning a housing component relative to a part of the seat frame, fixing the housing component to the part of the seat frame and fastening the housing component to the part of the seat frame.

10 Claims, 6 Drawing Sheets

METHOD FOR ASSEMBLING A TRANSMISSION COMPONENT FOR A SEAT HEIGHT ADJUSTMENT

CROSS-REFERENCES TO RELATED APPLICATIONS

This application claims the priority of German Patent Application, Serial No. 10 2018 110 525.8, filed May 2, 2018, pursuant to 35 U.S.C. 119(a)-(d), the disclosure of which is incorporated herein by reference in its entirety as if fully set forth herein.

BACKGROUND OF THE INVENTION

The present invention relates to a method for assembling a transmission component of a seat height adjustment on a seat frame of a motor vehicle seat.

The following discussion of related art is provided to assist the reader in understanding the advantages of the invention, and is not to be construed as an admission that this related art is prior art to this invention.

There are two opposing requirements for the height adjustment of a motor vehicle seat. On the one hand, the adjustment device should be easy to operate and should run noiselessly. Vibrations and rattle noises during travel should be prevented as far as possible. This requirement is essentially fulfilled by the fact that the drive pinion and the toothed segment through which the height adjustment is driven, engage against each other under preload without play. On the other hand, the drive pinion and the toothed segment should remain engaged even in the case of an accident in order to prevent the motor vehicle seat from being displaced and therefore reduces the risk of injury to an occupant. In order to fulfil this requirement, a preload between drive pinion and toothed segment is unfavorable, a small play or its compensation keeps the drive pinion and the toothed segment engaged even in the case of an accident.

It is an object of the invention to provide an improved method for assembling a transmission component of a seat height adjustment and an improved transmission component to obviate prior art shortcomings and to enable production and assembly without play and therefore as far as possible noiseless, in a cost-effectively and is at the same time more robust manner in the event of an accident.

SUMMARY OF THE INVENTION

According to one aspect of the present invention, a method for assembling a transmission component of a seat height adjustment on a seat frame of a motor vehicle seat, includes positioning a housing component relative to a part of the seat frame, fixing the housing component to the part of the seat frame; and fastening the housing component to the part of the seat frame.

In accordance with the present invention, a method for assembling a transmission component of a seat height adjustment to a seat frame of a motor vehicle seat comprises three method steps: In the first method step, a housing component is positioned to a part of the seat frame. The housing component is positioned in such a way that a correct contact without play is achieved between the parts of the transmission component, e.g. cogs or toothed segments. In the second method step, the housing component is fixed to the part of the seat frame. The housing component can be temporarily fixed, e.g. by a suitable marking of the position of the housing component, but it can also be permanently fixed by e.g. plastic deformation of the housing component. The only thing that is necessary is an exact anchorage of the correct position of the housing component. In the third method step, the housing component is fastened to the part of the seat frame. Fastening can be by screwing, riveting, welding or any other suitable procedure that ensures a secure and durable connection between the housing component and the seat frame part.

A method according to the invention, ensures that the parts of the transmission component interlock without play. This avoids vibration or raffling of the seat height adjustment. In the case of an accident, the parts of the transmission component are also prevented from being disengaged.

According to another advantageous feature of the present invention, the part of the seat frame can be a side part of the seat frame. Usually a motor vehicle seat has two side parts which are connected to each other by a pivot-mounted connection. The side parts are supported by parallel front and rear handlebars directly on the vehicle floor or on seat longitudinal adjustment rails. The seat height adjustment adjusts the seat frame by adjusting the inclination angle between the seat frame and the vehicle floor.

According to another advantageous feature of the present invention, the housing component can include a strike plate. The strike plate protects the parts inside from dirt and at the same time determines the correct position of the transmission component parts.

According to another advantageous feature of the present invention, both the seat part and the housing component each can have an opening and an outlet. Both outlets are positioned coaxially to each other. The outlets receive the bearings of the parts located in the housing component. The coaxial assembly ensures that a cog in the housing component is correctly aligned so that it does not rub against the seat frame part when it rotates around its rotational axis.

According to another advantageous feature of the present invention, the positioning can be effected by means of a positioning device. The positioning device allows coaxial alignment of the seat part and housing component outlets. This ensures that the parts of the transmission component interlock without play, avoiding vibrations or rattling of the seat height adjustment. In the case of an accident, the parts of the transmission component are also prevented from being disengaged.

According to another advantageous feature of the present invention, the positioning device can have the shape of a stepped cylinder. The outlets of the seat part and the housing component can have different diameters. Therefore, the positioning device has one end with the diameter of the seat part outlet and the other end with the diameter of the housing component outlet.

According to another advantageous feature of the present invention, the outlet of the seat part can be positioned on a first cylindrical stage of the positioning device. The first cylindrical stage can have a diameter of the outlet of the seat part.

According to another advantageous feature of the present invention, the outlet of the housing component can be positioned on a second cylindrical stage of the positioning device. The second cylindrical stage can have a diameter of the outlet of the housing component.

According to another advantageous feature of the present invention, the position of the housing component to the seat frame part can be fixed by a plastic deformation process. The housing component can be permanently fixed by plastic deformation of the housing component. However, the fixation can also be temporary, e.g. by a suitable marking of the position of the housing component. The only thing that is necessary is an exact anchorage of the correct position of the housing component.

According to another advantageous feature of the present invention, the plastic deformation process may include crimping, pressing and/or another bonding technique. Ideally, fixation at several points is effected by plastic deformation of the housing component through short-term sudden pressure boosting, e.g. by a metallic punch.

According to another advantageous feature of the present invention, the plastic deformation process deforms the housing component and/or the seat frame part. Fixation at several points by plastic deformation of the housing component. This usually causes the part of the seat frame to be deformed in a small area. The position of the housing component is fixed by these points.

According to another advantageous feature of the present invention, the housing component can be fastened to the seat frame part by means of a plastic deformation process. This advantageous variation of the fastening of the housing component does not require any further fastening means, e.g. screws, and can therefore be performed quickly, easily and also cost-effectively. Furthermore, in the case of an accident there are no instabilities, as known from bolted seat height adjustments.

According to another advantageous feature of the present invention, either the housing component can have a lug and the part of the seat frame can have an opening, or the housing component can have an opening and the part of the seat frame can have a lug. During positioning of the housing component to the seat frame part, one or more lugs can be led through the openings.

According to another advantageous feature of the present invention, the plastic deformation process for fastening the housing component to the part of the seat frame can be effected by bending the lugs led through the openings. This advantageous variation does not necessitate any other fastening means and can therefore be performed quickly, easily and also cost-effectively. Furthermore, in the case of an accident there are no instabilities, as known from bolted seat height adjustments.

According to another advantageous feature of the present invention, the method according to the invention includes the fastening of a first transmission component. The first transmission component sits rotationally tight on the pivot-mounted connection of the two side parts.

According to another advantageous feature of the present invention, the first transmission component can include a toothed segment. The teeth of the toothed segment lie on a circular line around the rotational axis of the pivot-mounted connection of the two side parts.

According to another advantageous feature of the present invention, the first transmission component with toothed segment is movably connected to the seat frame. The first transmission component, which is movably connected to the part of the seat frame, is driven, thereby adjusting the inclination angle between the part of the seat frame and the vehicle floor and also changing the seat height.

According to another advantageous feature of the present invention, the method according to the invention can include the fastening of a second transmission component. This second transmission component is usually a drive pinion.

According to another advantageous feature of the present invention, the second transmission component can include an engagement element. This engagement element is suitable for engagement in a toothed segment of the first transmission component.

According to another advantageous feature of the present invention, the second transmission component with engagement element can be firmly connected to the seat frame.

According to another advantageous feature of the present invention, the engagement element can be driven. Either manually or by motor-driven drive of the second transmission component, the first transmission component movably connected to the part of the seat frame is driven, which adjusts the inclination angle between the part of the seat frame and the vehicle floor and changes the seat height.

According to another aspect of the present invention, a housing component for receiving a transmission component of a seat height adjustment includes an outlet configured to receive a positioning device, a fixing device configured to fix a position of the housing component relative to a part of a seat frame, and a fastening device configured to firmly connect the housing component to the part of the seat frame.

A housing component according to the invention, which receives the transmission components of a seat height adjustment has three component parts: The first component part is an opening adapted to receive a positioning device. The second component part is a fixing device, by means of which the position of the housing component to a part of the seat frame can be fixed. The third component part is a fastening device that is adapted to firmly connect the housing component with a part of the seat frame.

According to the invention, the housing component ensures that the parts of the transmission component interlock without play. This avoids vibration or rattling of the seat height adjustment. In the case of an accident, the parts of the transmission component are also prevented from being disengaged.

According to another advantageous feature of the present invention, the outlet can be the opening adapted to receive a cylindrical positioning device. The positioning device has a diameter of the opening of the housing component.

According to another advantageous feature of the present invention, a fixing device can be used to establish a crimp connection to the part of the seat frame. The housing component can be permanently fixed by the crimp connection. However, the fixation can also be temporary, e.g. by a suitable marking of the position of the housing component. All that is necessary is a precise anchorage of the correct position of the housing component.

According to another advantageous feature of the present invention, the housing component can be fastened to the part of the seat frame by means of the fastening device. Fastening can be by screwing, riveting, welding or any other suitable procedure that ensures a secure and durable connection between the housing component and the seat frame part.

According to another advantageous feature of the present invention, the fastening device can be configured in the shape of a lug. This lug is adapted to produce a firm connection between housing component and seat frame part by bending the lug after leading the lug through an opening in the seat frame part. This advantageous variation eliminates the need for additional fasteners and is therefore quick, easy and cost-effective to perform. Furthermore, in the case of an accident there are no instabilities, as known from bolted seat height adjustments.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
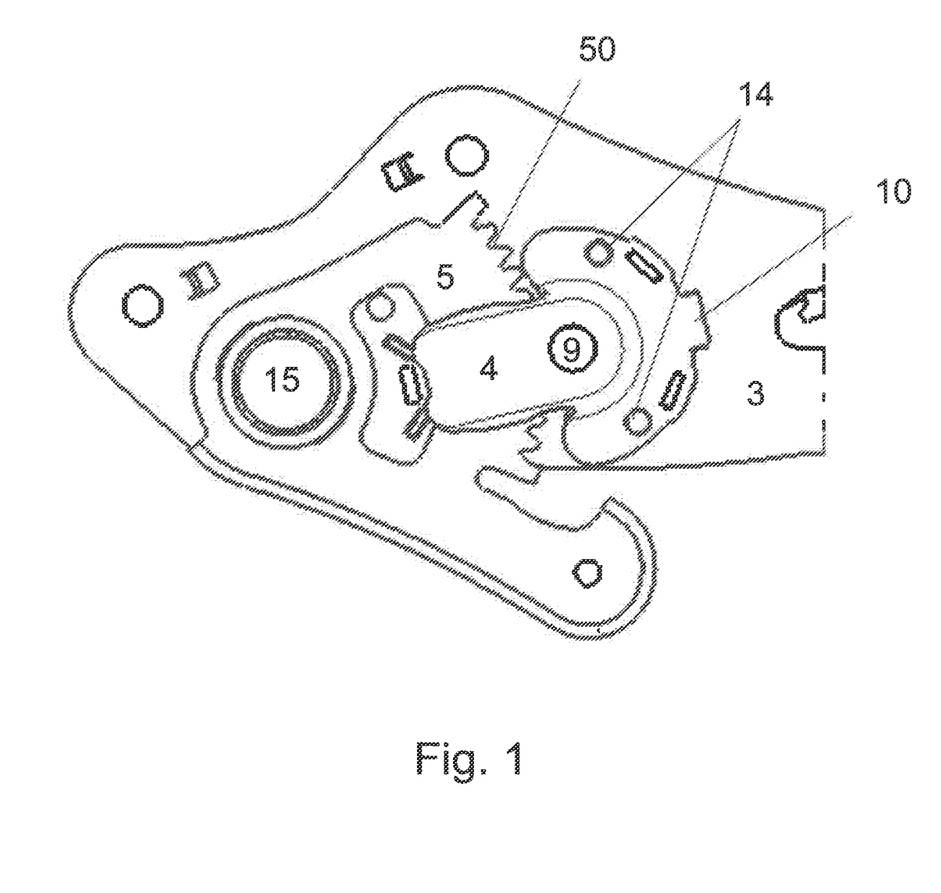
FIG. 1 is a spatial representation of a seat height adjustment with housing component according to present invention.

Turning now to the drawing, and in particular to FIG. 1, there is shown a spatial representation of the seat height adjustment of a motor vehicle seat 1 with a housing component 4 according to the invention. The motor vehicle seat 1 has two parts of the seat frame 3 which are connected to each other by a pivot-mounted connection 15. This figure shows only one part of the seat frame 3, the structure of the second part of the seat frame 3 is basically the same, only mirror-inverted. The parts of the seat frame 3 are supported by parallel front and rear handlebars directly on the vehicle floor or on seat longitudinal adjustment rails. The seat height adjustment adjusts the seat frame 2 by rotating the part of the seat frame 3. The first transmission component 5 has toothed segments 50, in which the second transmission component 6, which surrounds the housing component 4, engages. The first transmission component 5, which is movably connected to the part of the seat frame 3, is driven by manual or motor drive of the second transmission component 6, thereby adjusting the inclination angle between the part of the seat frame 3 and the vehicle floor and also changing the seat height. The housing component 4, which surrounds the second transmission component 6, is formed as a strike plate, fastened to the part of the seat frame 3 by means of one or more lugs 10 and has an outlet 9. The outlet 9 together with the fixing device 14 serves the correct positioning of the housing component 4.

Figures 2A, 2B:
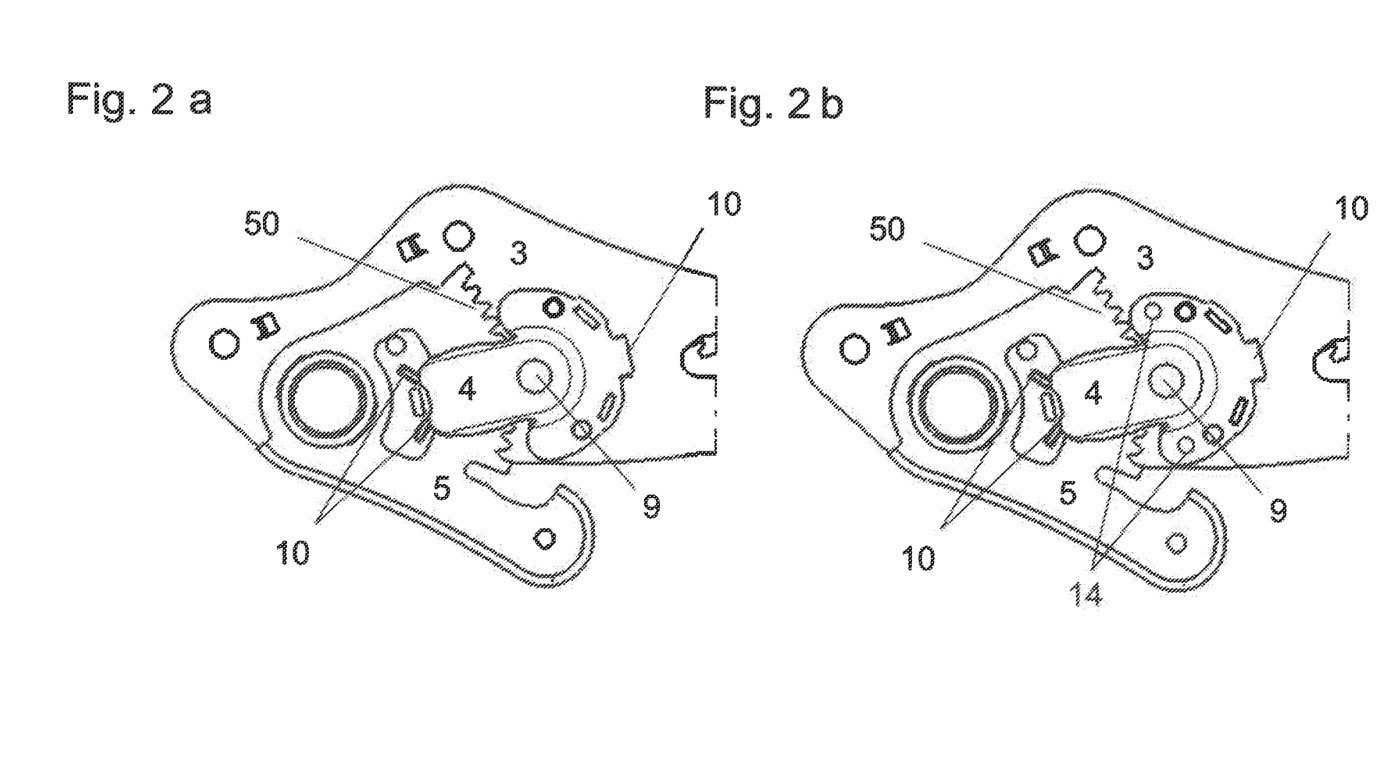
FIG. 2a is a top view of positioning and fixing of the housing component.
FIG. 2b is a top view of positioning and fixing of the housing component, position of the housing component fixed.

FIGS. 2a and 2b show top views of the positioning and fixing of the housing component 4. The housing component 4 surrounds the second transmission component 6, which engages in the toothed segments 50 of the first transmission component 5. The housing component 4 has an outlet 9 which allows the correct positioning of the housing component 4 by means of a positioning device 7 on the part of the seat frame 3 (FIG. 2a). In this example, the position of housing component 4 is fixed after correct positioning of housing component 4 by plastic deformation of several fixing devices 14, e.g. by pressing or crimping, the housing component 4 and part of the seat frame 3 are deformed in a small area (FIG. 2b). Once the position of the housing component 4 has been fixed by means of the fixing devices 14, the housing component 4 is fastened by means of lugs 10, which are led through corresponding openings 11 in the part of the seat frame 3.

Figure 3:
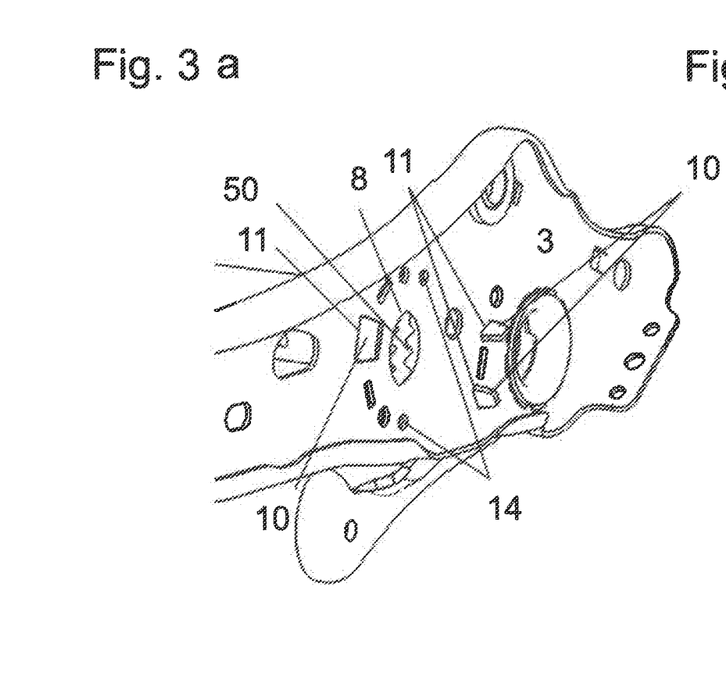
FIG. 3a a spatial representation of the fastening of the fixed housing component.
FIG. 3b a spatial representation of the fastening of the fixed housing component, bended lugs.
Figure 3B:
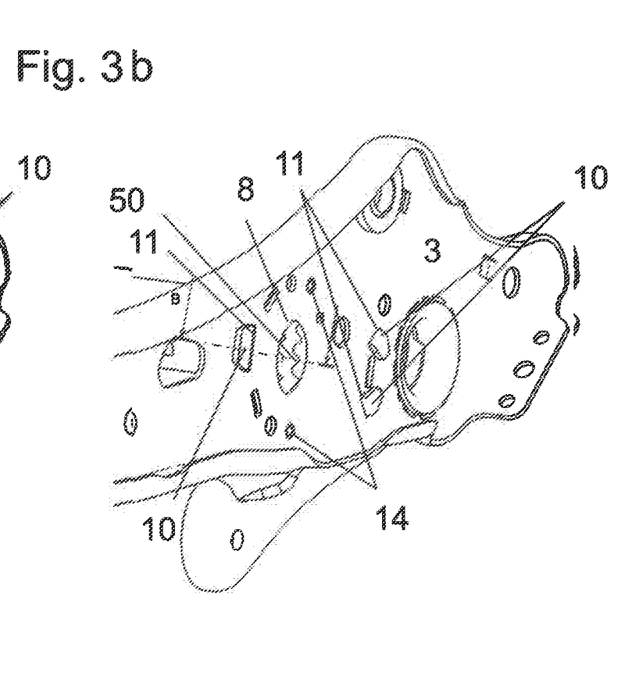

FIGS. 3a and 3b show spatial representations of the fastening of the fixed housing component 4. The part of the seat frame 3 has an outlet 8 through which the second transmission component 6 is introduced into the housing component 4 (not shown here). The second transmission component 6 engages in the toothed segments 50 of the first transmission component 5. The position of the housing component 4 is fixed by means of the fixing devices 14 (FIG. 3a). In this variation example, housing component 4 is fastened by plastic deformation of the lugs 10 attached to the housing component 4, which are led through corresponding openings 11 in the seat frame part 3. The lugs 10 are usually bent outwards and thereby fasten the housing component 4 to the part of the seat frame 3 (FIG. 3b). Alternatively, the part of the seat frame 3 can also have lugs 10, which are led through corresponding openings 11 of the housing component 4.

Figure 4A:
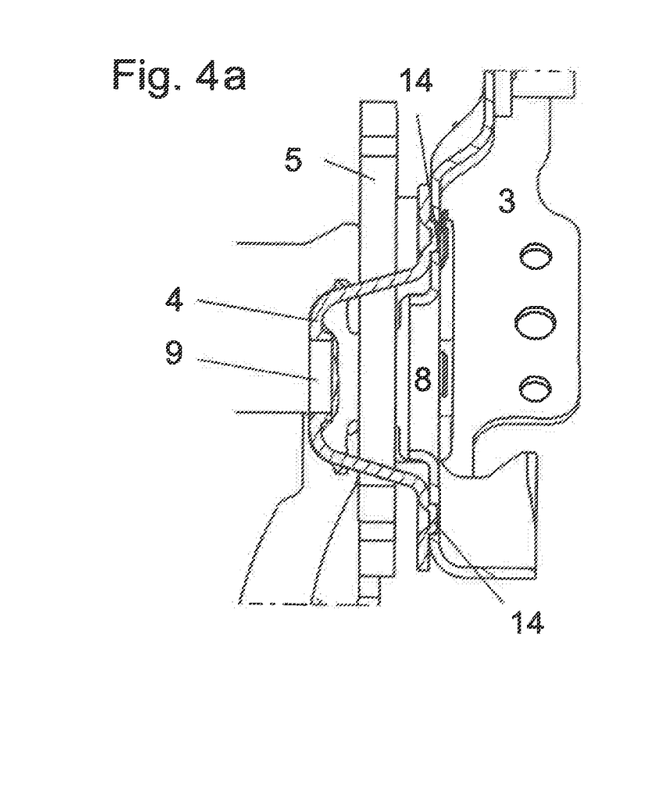
FIG. 4a a cross-sectional drawing of the fixed housing component.
Figure 4B:
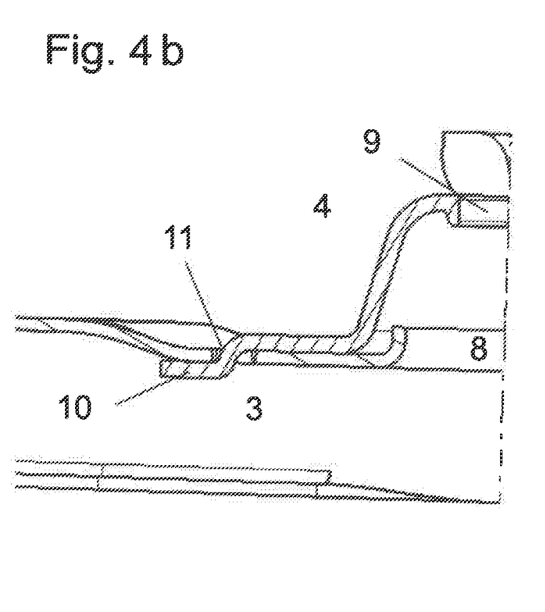
FIG. 4b a cross-sectional drawing of the fastened housing component.

FIGS. 4a and 4b show cross-sections through the fixed (FIG. 4a) and fastened (FIG. 4b) housing component 4. The part of the seat frame 3 is connected to another mirror-inverted part 3 via connection 15 and has an outlet 8 through which the second transmission component 6 is introduced into the housing component 4 (not shown here). The second transmission component 6 engages in the toothed segments 50 of the first transmission component 5. The housing component 4 has an outlet 9, its position is fixed to the part of the seat frame 3 by means of the fixing devices 14 (FIG. 4a) The fixing is effected by mechanical plastic deformation of housing component 4 and seat frame part 3, e.g. by pressing or crimping, ideally at several points of the housing component 4 which are as far apart as possible, in order to exclude twisting of the housing component 4 as far as possible before its fastening. After the housing component 4 has been fixed, it is fastened (FIG. 4b). For this purpose, the housing component 4 has lugs 10, the seat frame part has openings 11, through which the lugs 10 are led. The openings 11 are preferably formed as elongated holes. To fasten the housing component 4, the lugs 10 are bent over and they engage under the edge of the openings 11. Adhesion and frictional forces between lugs 10 and the edge of the openings ensure a secure and sufficiently tight fit of the housing component 4. This advantageous variation of the fastening of the housing component 4 requires no further fastening means, e.g. screw connections, and can therefore be carried out quickly, easily and also cost-effectively. Furthermore, in the case of an accident there are no instabilities, as known from bolted seat height adjustments.

Figure 5:
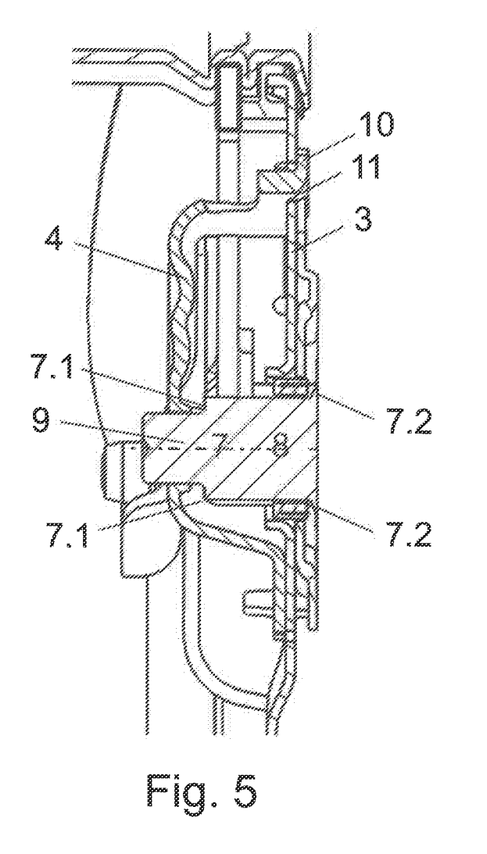
FIG. 5 a positioning of the housing component by means of a positioning device.

The positioning of the housing component 4 by means of a positioning device 7 is shown in FIG. 5. The part of the seat frame 3 has an outlet 8 through which the second transmission component 6 is introduced into the housing component 4 (not shown here). The housing component 4 has an outlet 9, which usually has a smaller diameter than the outlet 8 of the part 3 of the seat frame 2. The fixing device 7 has diameters in different stages 7.1, 7.2. Stage 7.2 corresponds to the diameter of the outlet 8 of part 3 of the seat frame 2, stage 7.1 to the diameter of the outlet 9 of the housing component 4. For exact positioning of the housing component 4, the fixing device 7 is led through the outlet 8 and then the housing component 4 is fitted onto the fixing device 7. This formation allows the housing component 4 and therefore the second transmission component 6 to be precisely positioned, thereby achieving a correct contact without play between the teeth of the first 5 and second transmission component 6 and also avoiding vibrations or chattering of the seat height adjustment. The position of the housing component 4 is then fixed and the housing component 4 is fastened by means of lugs 10 led through openings 11. The fixing device 7 is then removed.

Figure 6A:
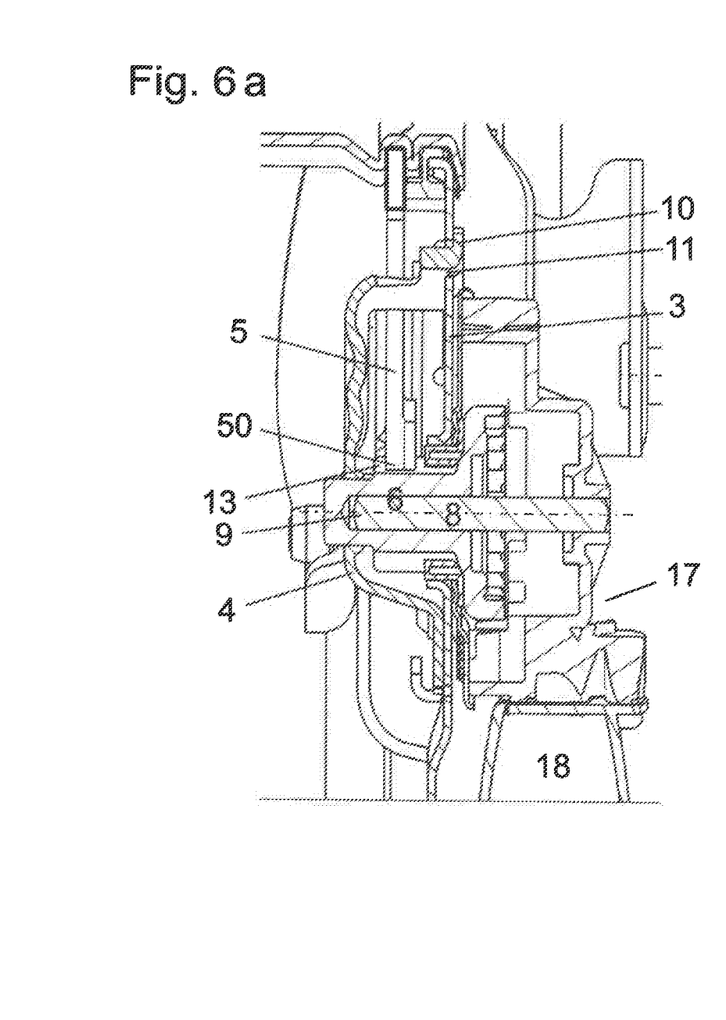
FIG. 6a a cross-sectional drawing of the ready-to-operate assembled seat height adjustment with motorized adjustment.
Figure 6B:
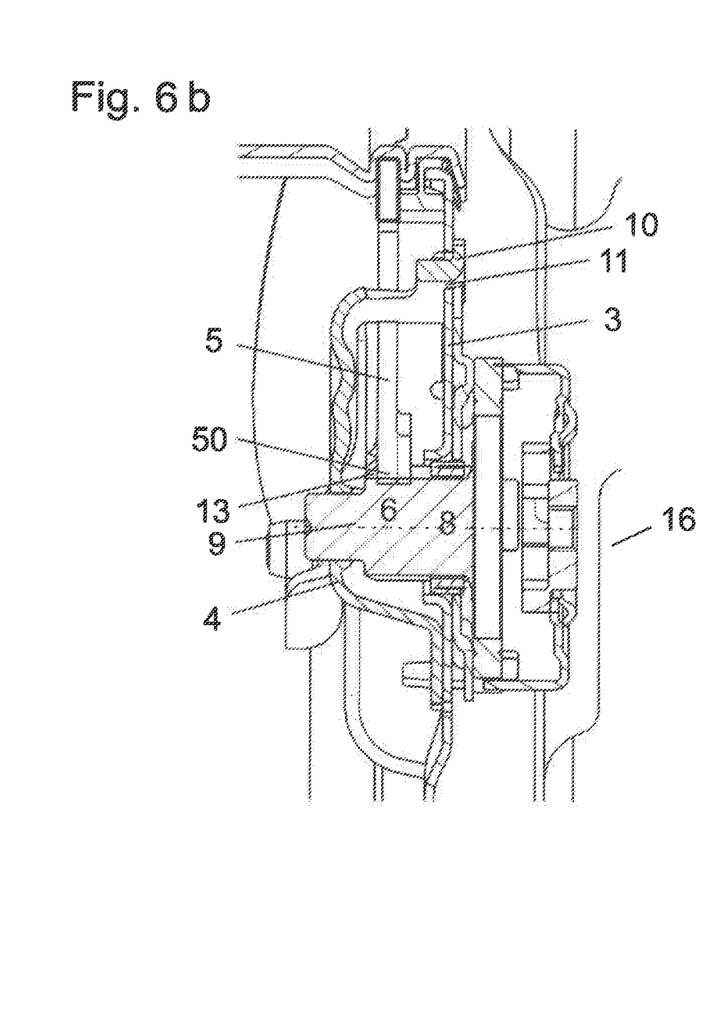
FIG. 6b a cross-sectional drawing of the ready-to-operate assembled seat height adjustment with manual adjustment.

FIGS. 6a and 6b show cross-sections of the ready-to-operate assembled seat height adjustment with motorized (FIG. 6a) and manual adjustment (FIG. 6b). Part of the seat frame 3 and the housing component 4, which surrounds the second transmission component 6, are connected to each other by means of lugs 10 led through openings 11. The engagement element 13 of the second transmission component 6 is usually formed as a drive pinion, engages in the toothed segments 50 of the first transmission component 5 and drives the first transmission component 5. The outlet 8 of the part 3 of the seat frame 2 and the outlet 9 of the housing component 4 mount the shaft of the drive pinion 13.

In the variant with motorized adjustment (FIG. 6a), the engagement means 13 are effected by a motorized drive 17 which has an electric motor 18. Furthermore, to increase the torque and reduce the speed, a transmission can be built in between motor 18 and engagement means 13. Depending on the rotational direction, the inclination angle between the part of the seat frame 3 and the vehicle floor is adjusted, thereby changing the seat height of the motor vehicle seat 1. This variant of the seat height adjustment does not require any screw connections for assembling, only the motorized drive is fastened with screws. This significantly reduces the assembly time compared to prior art solutions and increases the stability of the seat height adjustment in the case of an accident.

The variant with manual adjustment (FIG. 6b) has a manual drive 16, usually a hand lever, and the drive shaft of which projects through the part of the seat frame 3. This variant of the seat height adjustment does not require any screw connections for assembly, the number and type of parts are the same as the variant with motorized adjustment. Only the hand lever or motorized drive must be assembled. This significantly reduces the costs, especially for large series production, compared to prior art solutions.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for assembling a transmission component of a seat height adjustment on a seat frame of a motor vehicle seat, said method comprising:
   providing an outlet configured to receive a positioning device;
   positioning a housing component relative to a part of the seat frame;
   fixing the housing component to the part of the seat frame to effect a crimp connection of the housing component to the part of the seat frame; and
   fastening the housing component to the part of the seat frame,
   wherein the housing component comprises a strike plate.

2. The method of claim 1, further comprising positioning an outlet of the seat part and an outlet of the housing component in coaxial relationship.

3. The method of claim 2, wherein the positioning in coaxial relationship is effected by a positioning device, and wherein the positioning device has a shape of a stepped cylinder defining first and second cylindrical stages.

4. The method of claim 3, further comprising positioning the outlet of the seat component on a first cylindrical stage of the positioning device and/or positioning the outlet of the housing component on the second cylindrical stage of the positioning device.

5. The method of claim 2, further comprising fastening a transmission component comprising a toothed segment by movably connecting the transmission component with the toothed segment with the seat frame.

6. The method of claim 2, further comprising fastening a transmission component comprising an engagement element by engaging the engagement element a toothed segment to firmly connect the transmission component with the engagement element with the seat frame.

7. A housing component for receiving transmission component of a seat height adjustment, said housing component comprising:
   an outlet configured to receive a positioning device;
   a fixing device configured to fix a position of the housing component relative to a part of a seat frame; and
   a fastening device configured to firmly connect the housing component to the part of the seat frame,
   wherein the fixing device is configured to effect a crimp connection of the housing component to the part of the seat frame.

8. The housing component of claim 7, wherein the outlet is configured to receive a cylindrical configuration of the positioning device.

9. The housing component of claim 7, wherein the housing component is fastenable to the part of the seat frame by the fastening device.

10. The housing component of claim 7, wherein the fastening device has a shape of a lug configured to produce a fixed connection between the housing component and the part of the seat frame by bending the lug after the lug has been led through an opening in the part of the seat frame.

* * * * *